United States Patent
Steinweg et al.

(10) Patent No.: US 11,590,645 B2
(45) Date of Patent: *Feb. 28, 2023

(54) REVERSIBLE WRENCH RACK

(71) Applicant: APEX BRANDS, INC., Apex, NC (US)

(72) Inventors: Paul Steinweg, Lilitz, PA (US); Eric Van Fossen, Huntersville, NC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,111

(22) Filed: May 27, 2021

(65) Prior Publication Data

US 2021/0283767 A1     Sep. 16, 2021

Related U.S. Application Data

(63) Continuation of application No. 16/491,750, filed as application No. PCT/US2018/022801 on Mar. 16, 2018, now Pat. No. 11,059,163.

(60) Provisional application No. 62/472,232, filed on Mar. 16, 2017.

(51) Int. Cl.
 *B25H 3/04* (2006.01)
 *F16B 5/00* (2006.01)

(52) U.S. Cl.
 CPC ............. *B25H 3/04* (2013.01); *F16B 5/0052* (2013.01)

(58) Field of Classification Search
 CPC ............ B25H 3/04; B25H 3/06; B25H 3/003; F16B 5/0052
 See application file for complete search history.

(56) References Cited

U.S. PATENT DOCUMENTS

| | | | |
|---|---|---|---|
| 3,837,477 A | 9/1974 | Boudreau | |
| 3,946,512 A * | 3/1976 | Shapiro | A47G 1/1606 40/759 |
| 4,690,285 A | 9/1987 | Stone | |
| 4,705,168 A * | 11/1987 | Ward | A47B 88/988 206/376 |
| 5,388,694 A | 2/1995 | Arendt | |
| 5,505,316 A * | 4/1996 | Lee | B25H 3/04 206/376 |
| 5,544,747 A | 8/1996 | Horn | |
| 5,638,964 A | 6/1997 | Ernst | |
| 5,884,782 A | 3/1999 | Dembicks | |

(Continued)

FOREIGN PATENT DOCUMENTS

DE      102008041572 A1    10/2009
GB           2505422 A      3/2014

*Primary Examiner* — Ko H Chan
(74) *Attorney, Agent, or Firm* — Burr & Forman LLP

(57) ABSTRACT

A wrench rack includes a base portion having a first side and a second side, and a first rail and a second rail. Each of the first rail and second rail includes a plurality of wrench slots formed at a predetermined angle. The first rail and second rail are releasably coupled with the first side and second side of the base portion, respectively, in a first configuration and the first rail and second rail are releasably coupled to the second side and first side of the base portion, respectively, in a second configuration, such that an orientation of the predetermined angle of the wrench slots of the first configuration is reversed in the second configuration.

17 Claims, 9 Drawing Sheets

(56) References Cited

U.S. PATENT DOCUMENTS

| | | | |
|---|---|---|---|
| 6,039,178 A * | 3/2000 | Ernst | B25H 3/003 |
| | | | 206/376 |
| 7,987,981 B1 | 8/2011 | Lee | |
| 8,016,139 B2 * | 9/2011 | Hanners | A47F 5/005 |
| | | | 211/184 |
| 8,096,516 B2 | 1/2012 | Shiao | |
| 8,118,162 B1 | 2/2012 | McEwin | |
| 8,403,155 B1 | 3/2013 | Kao | |
| 8,479,929 B1 * | 7/2013 | Kao | B25H 3/04 |
| | | | 211/70.6 |
| 2004/0238708 A1 | 12/2004 | Berry | |
| 2007/0141885 A1 | 6/2007 | Chen | |
| 2009/0218302 A1 * | 9/2009 | Winnard | B25H 3/003 |
| | | | 211/70.6 |
| 2013/0153521 A1 | 6/2013 | Kao | |
| 2015/0354612 A1 | 12/2015 | Koch | |
| 2016/0214254 A1 | 7/2016 | Ou | |
| 2017/0190047 A1 | 7/2017 | Kao | |
| 2017/0341218 A1 | 11/2017 | Maruzzo | |
| 2018/0361563 A1 | 12/2018 | Hurley | |
| 2019/0061139 A1 | 2/2019 | Kao | |

\* cited by examiner

REVERSIBLE WRENCH RACK

TECHNICAL FIELD

Example embodiments generally relate to hand tool storage and, in particular, relate to a reversible wrench rack.

BACKGROUND

Typical wrench racks, such as wrench rack 100 depicted in FIG. 1A are designed with the largest wrenches on top descending to the smallest wrenches at the bottom. This wrench rack design may create voids 102 in tool drawers that waste storage space. The wasted space may limit or prevent the storage of additional wrenches in the tool drawer in an organized manner. The orientation of a wrench rack 100A may be reversed as depicted by wrench rack 100B of FIG. 1B. However, the wrench slot orientation 102A of the first wrench rack 100A may be in a first direction and the wrench slot orientation 102B in the second wrench rack 100B may be in a second direction, e.g. away from the user as depicted in FIG. 1B.

Reversed wrench racks 104B may be purchased to complement a standard wrench rack 104A, as depicted in FIG. 1C. The reversed wrench rack 104B may be designed with the smallest wrench at the top and descend to the largest wrench at the bottom. Both the standard wrench rack 104A and the reversed wrench rack 104B may have the same direction of slot orientation 106. An additional example of a standard wrench rack 104A and reversed wrench rack 104B is depicted in FIG. 2A.

Some users may forgo wrench racks opting for a form cut out storage system 200, as depicted in FIG. 2B. However, these systems are expensive, and are not flexible to accommodate new or different tools or storage configurations. Another example wrench storage system option is an injection molded tray 202, as depicted in FIG. 2C. Injection molded systems may not be configured for quick location and retrieval or replacement of tools, e.g. grab and go.

BRIEF SUMMARY OF SOME EXAMPLES

According to some example embodiments, a wrench rack is provided including a base portion having a first side and a second side and a first rail and a second rail, where each of the first rail and the second rail includes a plurality of wrench slots formed at a predetermined angle. The first rail and second rail are releasably coupled with the first side and second side of the base portion, respectively, in a first configuration and the first rail and second rail are releasably coupled to the second side and first side of the base portion, respectively, in a second configuration, such that an orientation of the predetermined angle of the wrench slots of the first configuration is reversed in the second configuration.

BRIEF DESCRIPTION OF THE SEVERAL VIEWS OF THE DRAWING(S)

Having thus described the tool in general terms, reference will now be made to the accompanying drawings, which are not necessarily drawn to scale, and wherein:

DETAILED DESCRIPTION

Figure 1A:
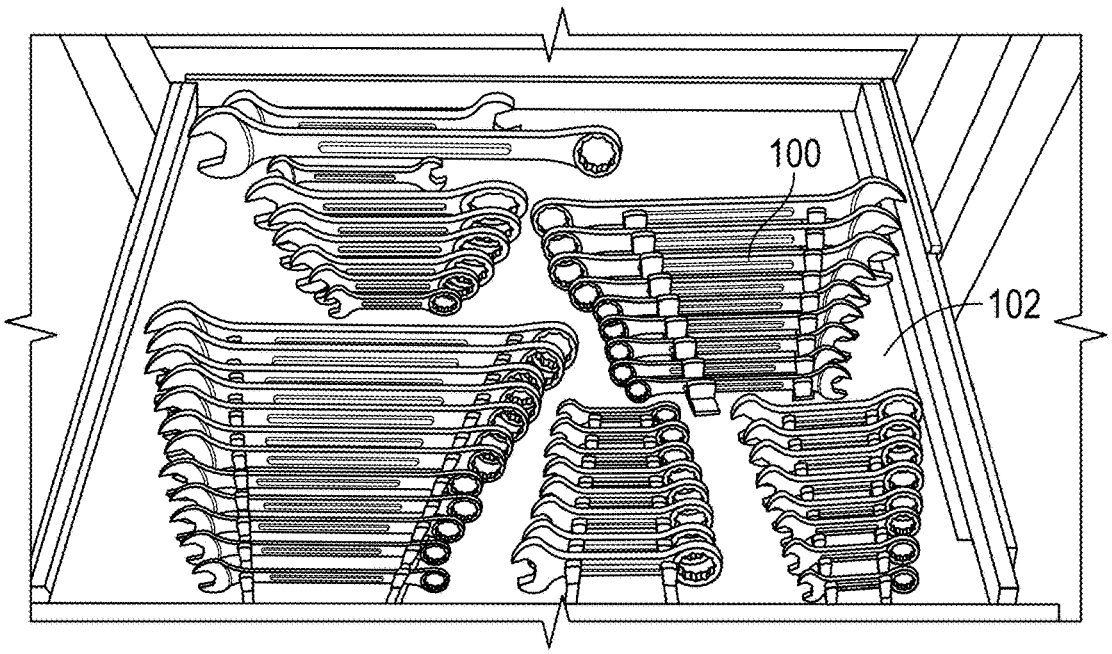
FIG. 1A illustrates a tool drawer including a plurality of wrench racks.
Figure 1B:
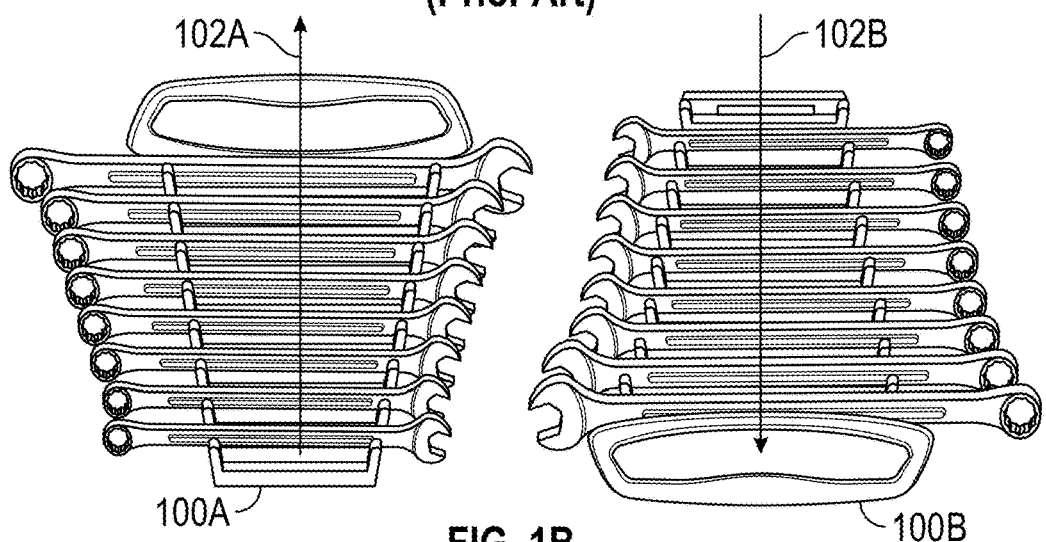
FIGS. 1B and 1C illustrate example prior art wrench racks.
Figure 1C:
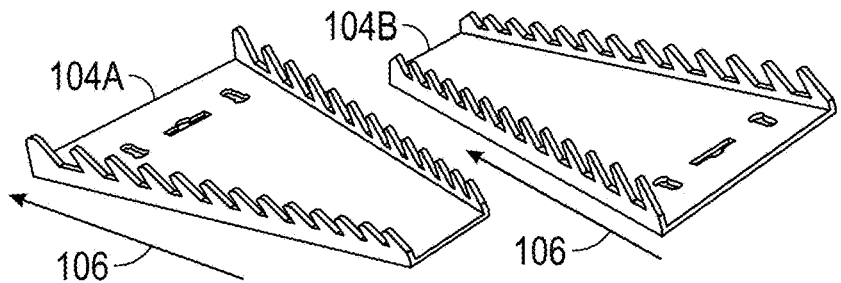
Figure 2A:
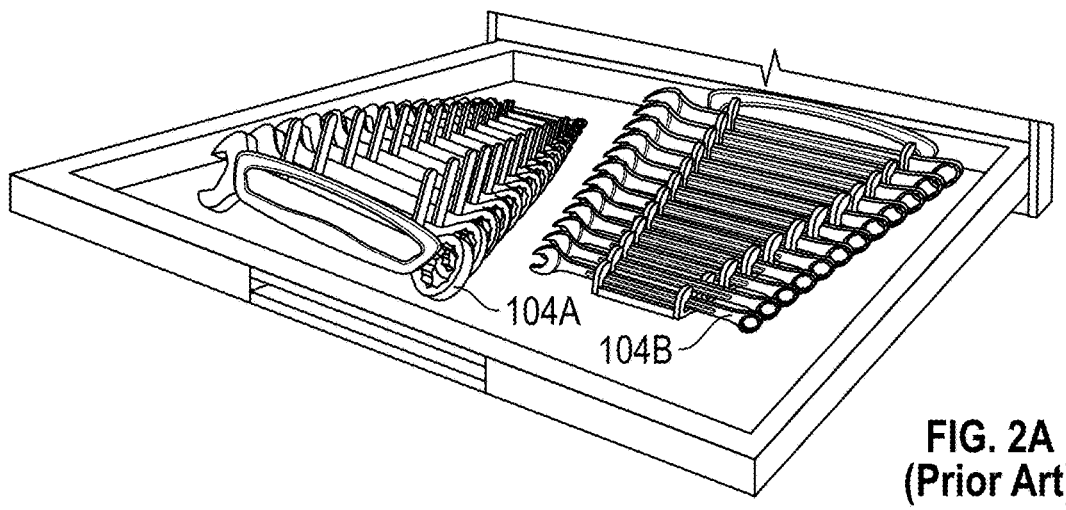
FIGS. 2A-2C illustrates example prior art wrench storage systems.
Figure 2B:
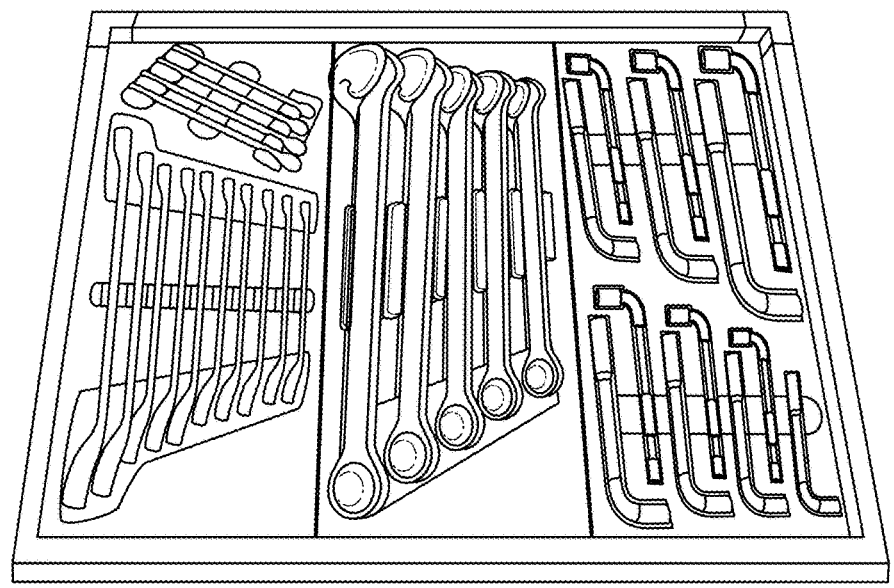
Figure 2C:
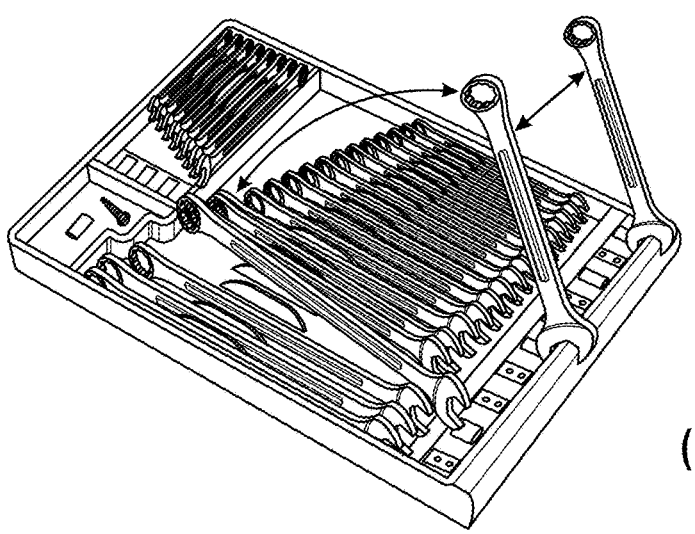

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

A wrench rack is provided with a reversible wrench storage orientation. The wrench rack may include detachable rails with a plurality of wrench slots. Reversing the rails may allow the orientation of the wrench slots to be reversed, such that the wrenches may be stored with the largest wrench on top descending to the smallest wrench on the bottom in a first configuration or the smallest wrench on top descending to the largest wrench on the bottom in a second configuration. The orientation of the wrench slots may be in the same direction in the first and second configuration. The rails may be connected to a base portion of the reversible wrench rack by a dove tail connection, tongue and groove connection, snap fit or the like. In an example embodiment, the wrench rack may include one or more mounting elements, which may be configured to be mounted in the first or second configuration. In some example embodiments, the wrench rack may be formed to accommodate one or multiple wrench sets, such as a 7 piece set, a 9 piece set, a 12 piece set, a 16 piece set, or the like. A smaller extension set (e.g., a four piece extension set, or any suitable size) may also be provided. The wrench rack may include a plurality of removable segments to accommodate the number of wrenches to be stored.

Example Reversible Wrench Rack

Figure 3A:
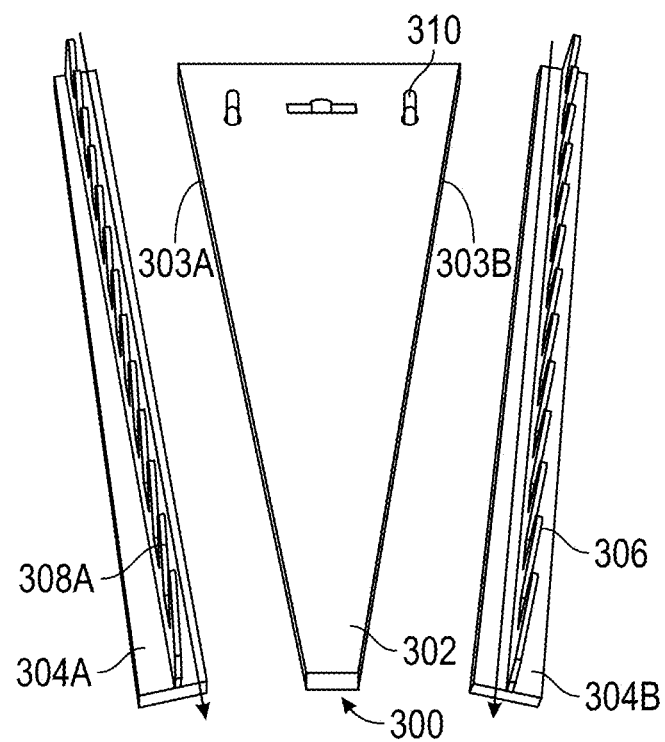
FIGS. 3A-3C illustrate an example reversible wrench rack according to an example embodiment.
Figure 3B:
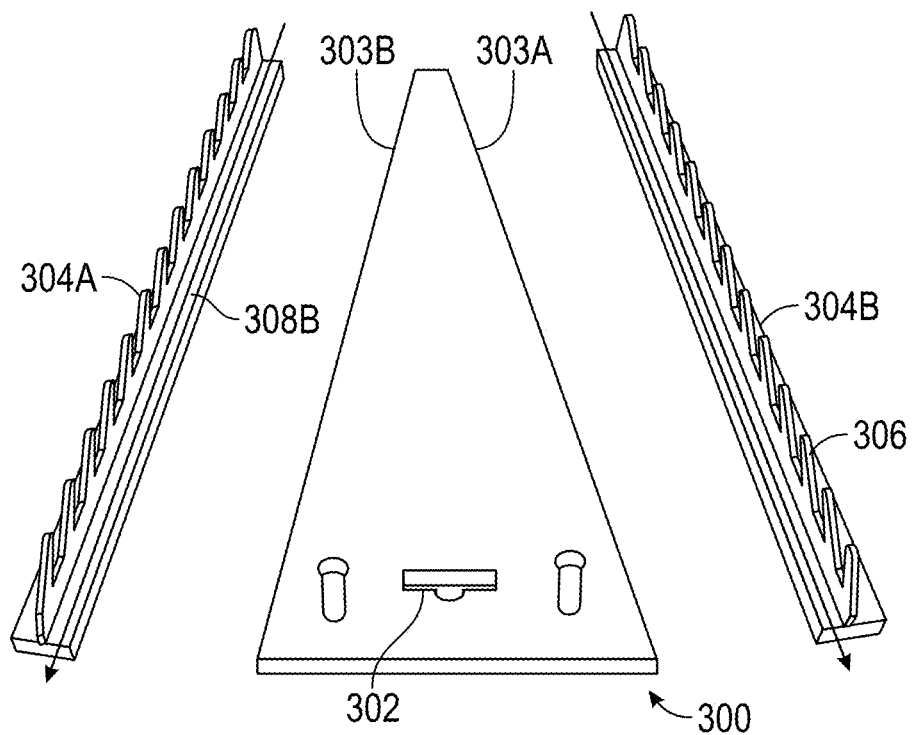

An example embodiment of the reversible wrench rack will now be described in reference to FIGS. 3A and 3B. FIGS. 3A and 3B illustrate a wrench rack 300 including a base portion 302 and rails 304. The base portion 302 may have a substantially triangular or polygonal shape. The polygonal shape may include a first end with a first width and a second end with a second width, which is shorter than the first width. The base portion 302 may include a first side 303A and a second side 303B.

The rails 304 may include a plurality of wrench slots 306. Each of the wrench slots 306 may be formed at a predetermine angle to assist with retention of a wrench. The predetermined angle of the wrench slots may define an orientation direction 308A, in which the wrench slots 306 are configured to receive a wrench. The rails 304 may be releasably coupled to the first and second sides 303A and 303B of the base portion 302. In a first configuration, the first rail 304A is operably coupled to the first side 303A and the second rail 304B is operably coupled to the second side 303B, as depicted in FIG. 3A. Wrenches may be received by the wrench slots 306 with the largest wrench at the top descending to the smallest wrench at the bottom, as indicated by the orientation direction 308A. In a second configuration, the first rail 304A may be operably coupled to the second side 303B and the second rail 304B may be operably coupled to the first side 303A, as depicted in FIG. 3B. The wrench slots 306 may receive wrenches in the wrench slots 306 with the smallest wrench at the top and descending to the largest wrench at the bottom, as depicted by the orientation direction 308B. The orientation direction 308A of the wrench slots 306 of the first configuration may be reversed relative to orientation direction 308B in the second configuration with respect to the base portion 302. In both cases, the wrench slots 306 angle upward to hold a wrench therein by reversing the positioning of the first and second rails 304A and 304B relative to the first and second sides 303A and 303B of the base portion 302. Effectively, the base portion 302 is flipped in orientation from the wider portion being on top, to the wider portion being on the bottom (i.e., the pointing direction of the apex of the base portion 302 is flipped).

In some example embodiments, the predetermined angle of the wrench slots 306 may retain wrenches at an angle in the wrench rack 300. Orienting the wrench slots 306 in this way may enable viewing of the size and/or type of the wrench, which may generally be provided on the tool shaft. In an example embodiment, the direction of the base portion 302 of a second wrench rack 300' may be reversed relative to a first wrench rack 300. By configuring the first wrench rack 300 in the first configuration and the second wrench rack 300' in the second configuration, the same orientation direction 308A and 308B may be achieved on both the first and second wrench racks 300, 300'. Having the opposing configuration wrench racks 300 with the same orientation direction 308A and 308B may substantially reduce void or wasted space in tool drawers when multiple wrench racks are stored therein. In this regard, the user may define any desirable configuration and alternate adjacent wrench racks to maximize the efficient use of the space.

In some example embodiments, the wrench rack may include one or more mounting elements 310. The mounting elements 310 may be mounting apertures, hooks, or the like. The mounting elements 310 may be configured for mounting in the first or second configuration, e.g. the mounting elements 310 may be located proximate to one or each of the end portions of the base portion 302. The predetermined angle of the wrench slots 306 may be configured to provide resistance to gravity in response to vertical mounting of the wrench rack 300.

Although the wrench rack 300 discussed herein is configured for to retain wrenches, one of ordinary skill in the art would immediately appreciate that the wrench rack may be configured for other tools, especially those with varied sizes, such as screwdrivers.

Figure 3C:
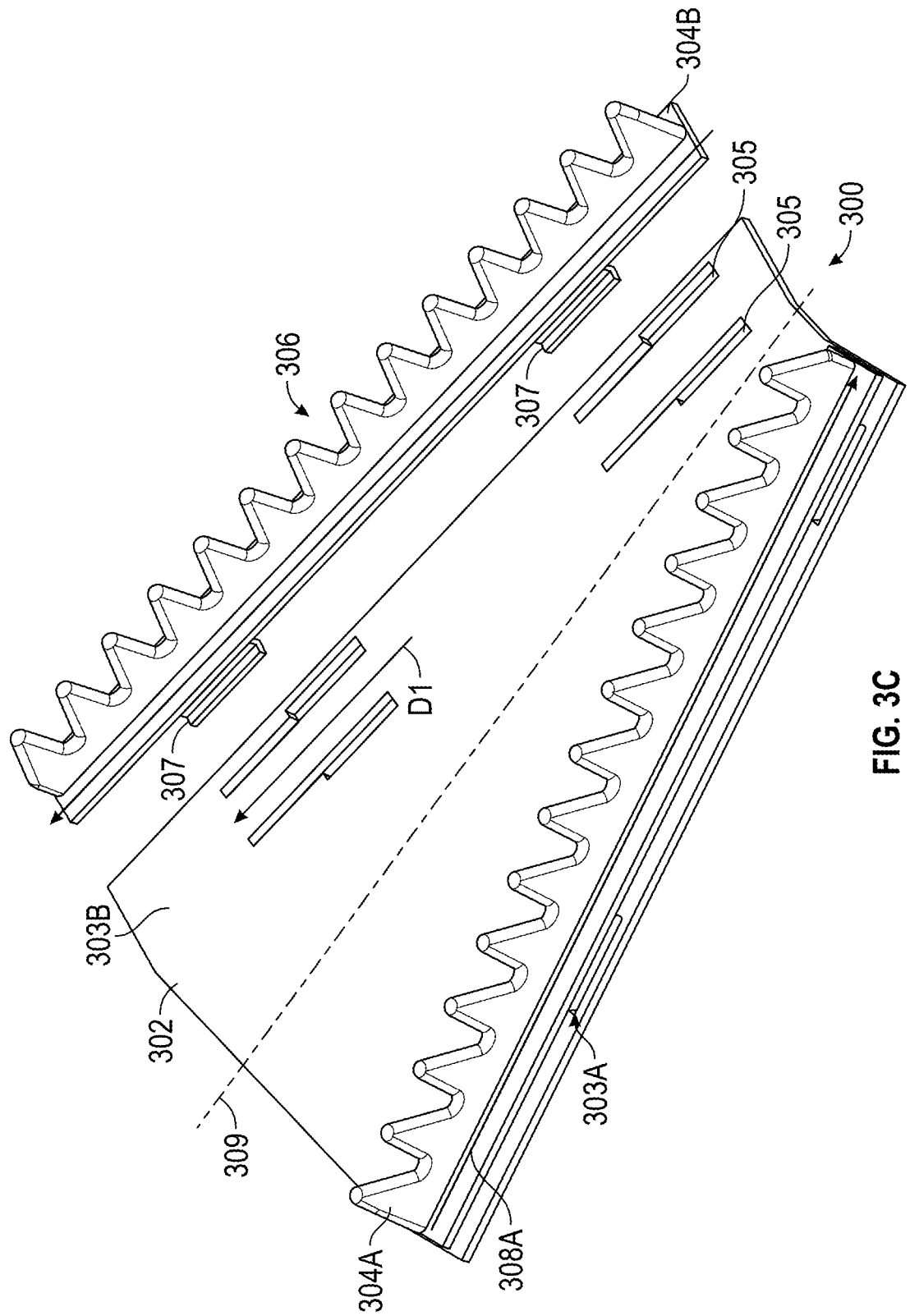

FIG. 3C illustrates an example wrench rack 300 including the first rail 304A in the orientation direction 308A of the first configuration and the second rail 304B in the orientation direction 308B of the second configuration. The first and second rails 304A and 304B of the wrench rack 300 may be releasably coupled to the base portion 302 by a tab and slot connector. The first and second rails 304A and 304B may each include a tab 307 configured to be inserted into a slot 305 (which is located to face and receive the tab 307 on the base portion 302). However, it should be appreciated that the locations of the tab 307 and the slot 305 could be swapped in some cases. The slot 305 may have a larger opening at a first end configured to receive the tab 307. The tab 307 and associated rail 304 may be slid in a first direction D1 into an engaged position, e.g., into a smaller width portion of the slot 305. In an example embodiment, the tab and slot connection may be a friction connection, in which the tab 307 is retained in the slot 305 by tightness of the connection and friction.

In some example embodiments the base portion 302 may include a plurality of connector positions, such as a first connector, e.g., slots 305 or tabs 307, at a first distance from a longitudinal center axis 309 of the base portion and a second connector, e.g., slots 305 or tabs 307, at a second distance from the longitudinal center axis 309 of the base portion 302. The plurality of connector positions may allow for at least one of the first rail 304A and second rail 304B to be connected at a plurality of distances from the longitudinal center axis 309, which may accommodate storage of shorter or longer wrench sets.

Figure 4A:
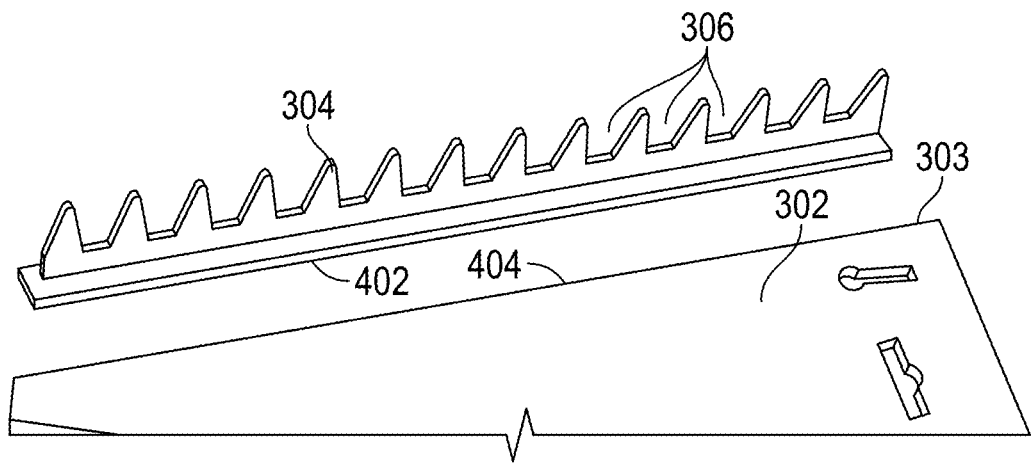
FIGS. 4A-4C illustrate an example reversible wrench rack including a tongue and groove connection according to an example embodiment.
Figure 4B:
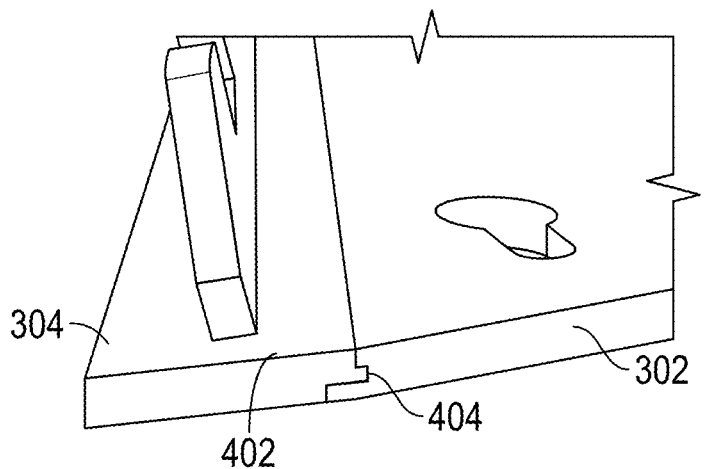
Figure 4C:
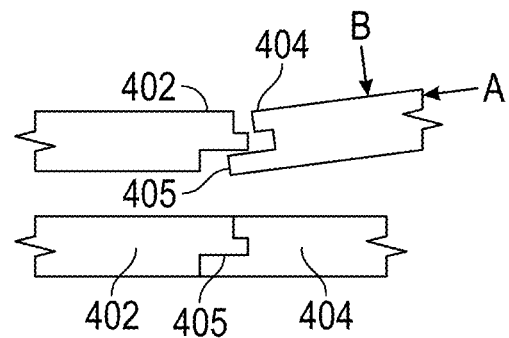

FIGS. 4A-C illustrate releasably coupling the rails 304 to the base portion 302 by a tongue and groove connector. The rail 304 or the side 303 may include a tongue 402 extending outward and the opposing side 303 or rail 304 may include a complementary groove 404. The tongue 402 may be inserted into the groove 404 to operably couple the rail 304 to the base portion 302. In some example embodiments, the tongue and grove connector may be a friction connection, in which the tightness of the joint and friction limit the tongue 402 from withdrawal from the groove 404. In an example embodiment, the tongue and grove connector may be a snap fit connection. For example, the groove 404 may positioned at an angle at an edge of the tongue 402, as depicted in FIG. 4C. A force A may be applied to the groove 404 in the direction of the tongue 402 and a force B applied in a direction to align the tongue 402 and groove 404. The force A and force B may lever the tongue 402 past a connection feature 405, e.g., snap fitting such as a ridge or protrusion, causing the tongue 402 to enter the groove 404. The connection feature 405 may retain the tongue 402 in connection with the groove 404.

Figure 5B:
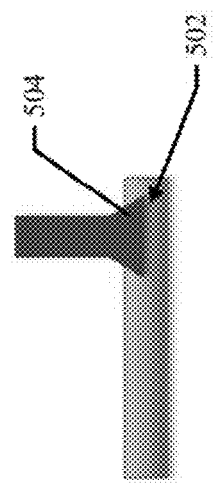
FIG. 5A and FIG. 5B illustrate an example reversible wrench rack including a dove tail connection according to an example embodiment.
Figure 5C:
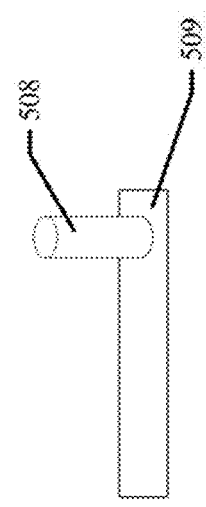
FIG. 5C illustrates an example reversible wrench rack including a pin and receiver connection according to an example embodiment.
Figure 5A:
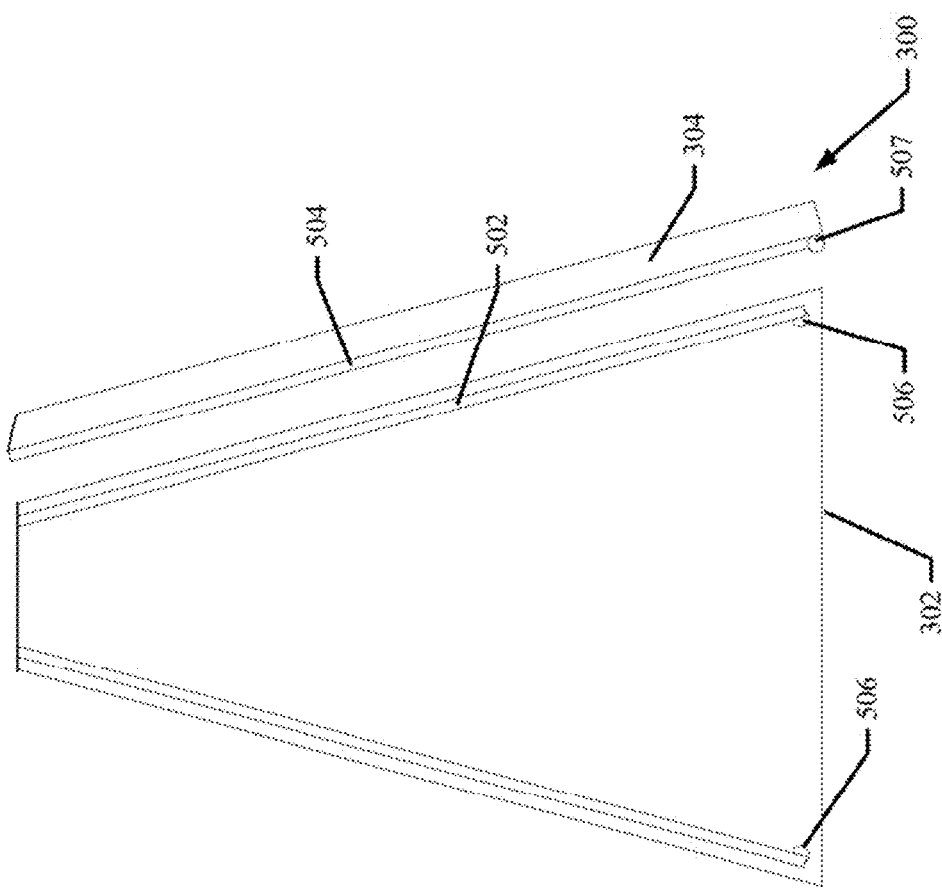

In the example wrench rack 300 illustrated in FIGS. 5A and 5B, the rail 304 may be operably coupled to the base portion 302 by a dove tail connection. The base portion 302 or the rails 304 may include a dove tail groove 502 and the opposing rail 304 or base portion 302 may include a complementary dove tail projection 504. The rails 304 may be releasably coupled to base portion 302 by sliding the dove tail projection 504 into the dove tail groove 502. In some embodiments, the dove tail connection may be a friction connection, in which the dove tail projection 504 is retained in the dove tail groove 502 by tightness of the connection and friction. In some example embodiments, the dove tail connection may be a snap connection including a connection feature, such as a groove projection or recess 506 and a complementary feature 507 on the dove tail projection 504. The feature 507 and groove projection or recess 506 may mate when the rails 304 are fully slid, inserted into, or otherwise coupled with the base portion 302 resisting decoupling of the rails 304 from base portion 302.

In another example embodiment, the releasable connection may include a plurality of pins 508 and receivers 509, as depicted in FIG. 5C. The pins 508 may be disposed on the base portion 302 or rails 304 and a complementary receivers 509 may be disposed on the opposing rail 304 or base portion 302. The pins 508 may be inserted into the receiver 509, and retained in connection due to friction and/or a snap fit feature. Additionally or alternatively, the base portion 302 may be operably coupled to the rails 304 by adhesive, screws, snaps, or other connectors.

In an example embodiment, the base portion 302 and or the rails 304 may be segmented to allow for adjustability relative to configuration of the wrench wrack to accommodate respective different instances of a predetermined number of wrenches. The base portion 302 may be formed, such as by injection molding, with a central part 602 and one or more detachable segments 604. The segments 604 may be defined by a groove, a perforation, or the like, which may be cut, snapped off, or otherwise detached from the central part 602. Similarly, the rails 304 may include a rail central part 606 and one or more rail segments 608, which may correspond with the one or more segments 604 of the base portion 602. The rail segments 608 may be defined by a groove, perforation, or the like, which may be cut, snapped off, or otherwise detached from the rail center part 606.

Figure 6:
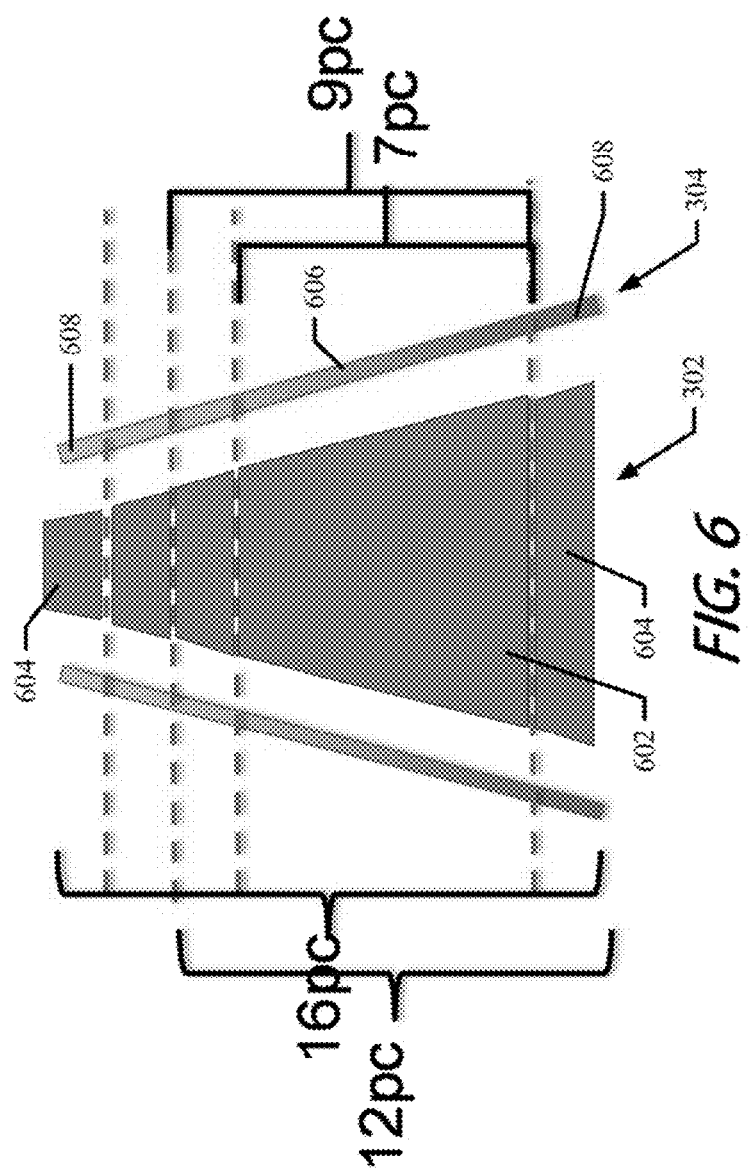
FIG. 6 illustrates an example base portion including segmented portions according to an example embodiment.

The user or manufacture may detach the segments 604 and rail segments 608 from the central part 602 and the rail central part 606, respectively, to accommodate respective different predetermined numbers of wrenches, such as 7 wrenches, 9 wrenches, 12 wrenches, 16 wrenches or the like. The segmentation may enable one wrench rack 300 to be formed by a manufactured to accommodate varying numbers of wrenches. As shown in FIG. 6, the segments 604 and 608 may be disposed on both ends of the central part 602 and rail central part 606, respectively. This allows the user to also determine the largest base width and smallest base width that are to be accommodated by the adjustability of the size and shape of the base portion 302. Otherwise, either the maximum or minimum width of the base portion 302 would be fixed.

Figure 7B:
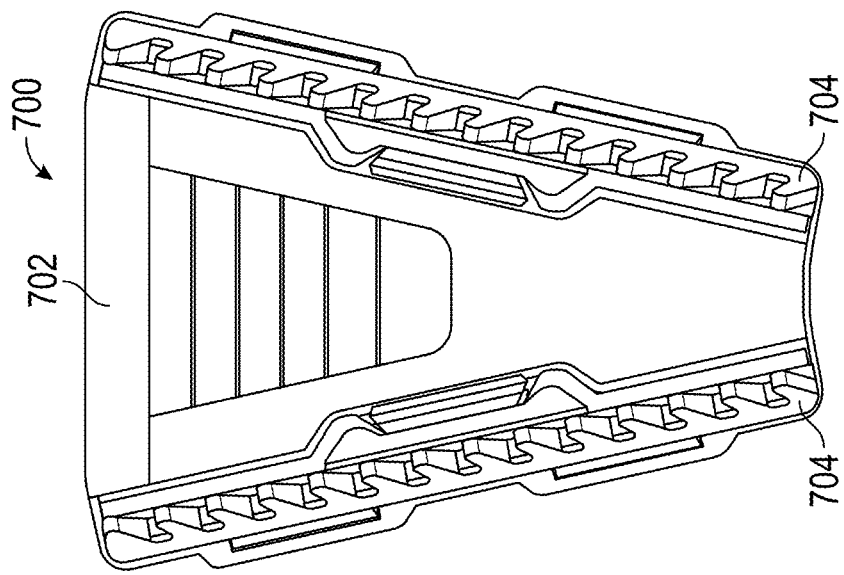
FIG. 7B illustrates a front or top view of the wrench rack design of FIG. 7B with the rails fully installed in accordance with an example embodiment.
Figure 7A:
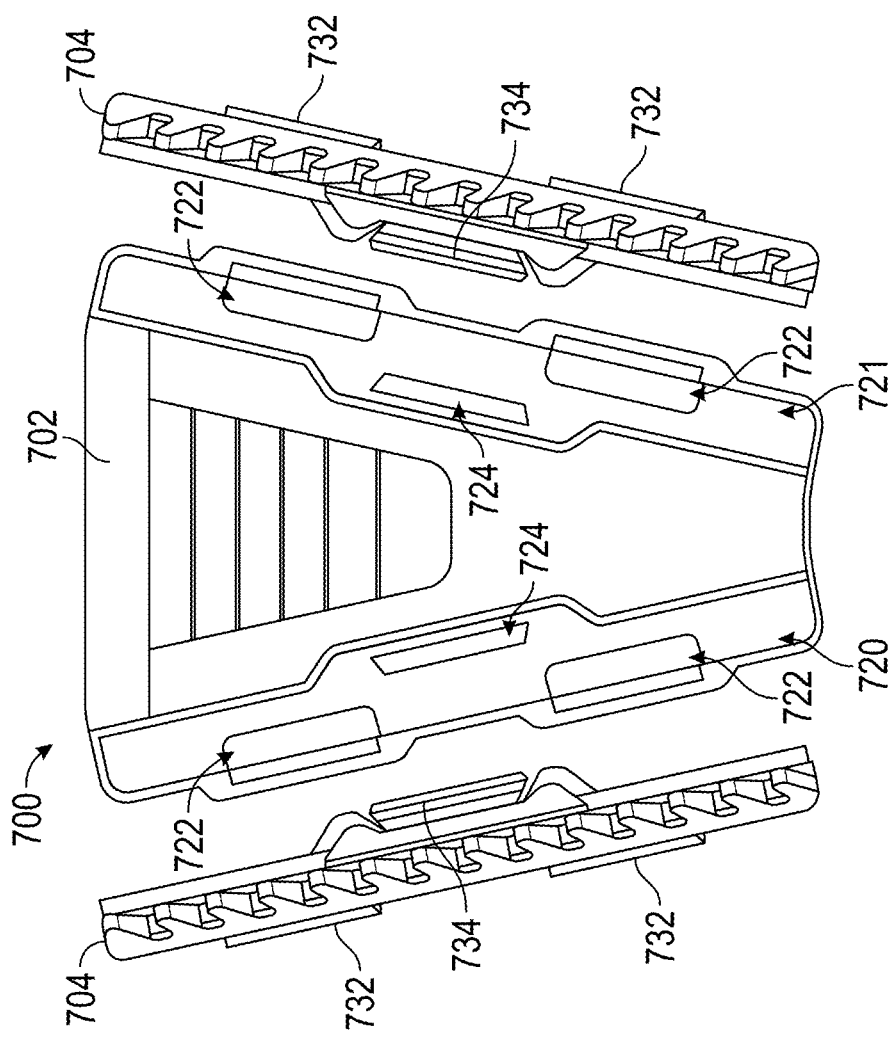
FIG. 7A illustrates a front or top view of an alternative wrench rack design with a quick release connection having the rails removed in accordance with an example embodiment.
Figure 7C:
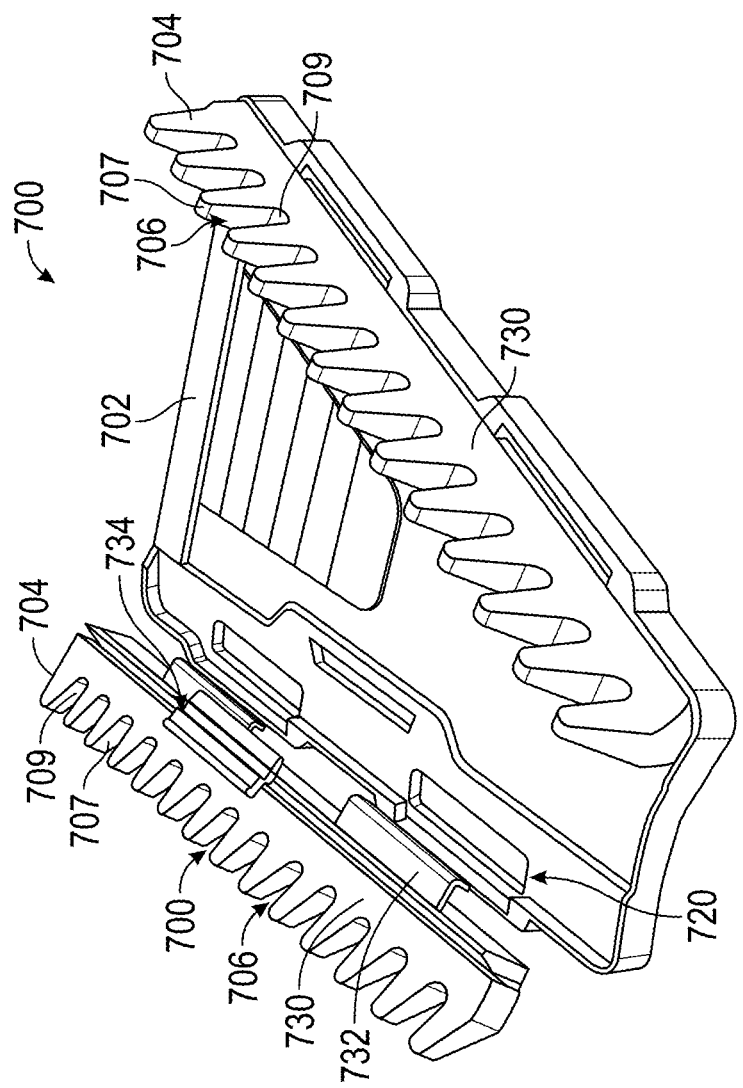
FIG. 7C illustrates a perspective view of the wrench rack design of FIGS. 7A and 7B with one of the rails aligned for mating with the base portion in accordance with an example embodiment.

In an example embodiment, the segments 604 or rail segments 608 may be removably coupled to the central part 602 or rail central part 606. For example, the segments 604 or rail segments may be removably coupled to the central part 602 or rail central part 606 by a tongue and groove connection, a dove tail connection, a pin and receiver connection, a snap fit connection, or the like. FIGS. 7A, 7B and 7C illustrate another example connection paradigm that could be employed to connect rails of a wrench rack to a base portion.

Referring now to FIGS. 7A, 7B and 7C, wrench rack 700 may include a base portion 702 and rails 704. As discussed above, the rails 704 may include slots 706 that are formed between adjacent protrusions 707 formed in the rails 704. The slots 706 may each include slot apex 709, and the protrusions 707 may be formed to orient the slots 706 to open in a similar direction. Accordingly, each wrench that is retained in a corresponding one of the slots 706 will be retained at a similar orientation or angle relative to the longitudinal centerline of the rails 704. Thus, for example, the slots 706 may be oriented slightly upward to retain the wrenches when the base portion 702 is attached to a wall or other vertically oriented surface. Alternatively, if the base portion 702 is disposed in a horizontal plane (e.g., in a tool box) the wrenches will all be tilted at a same angle to maintain efficient storage and a look of organization.

As noted above, the rails 704 are effectively exchangeable to reverse the orientation of the slots 706. For example, the rails 704 can be attached in a first configuration that has the slots 706 angled toward a wider side of the base portion 702 between the sides thereof to which the rails 704 are attached. Then the rails 704 can be swapped to be attached in a second configuration that has the slots 706 angled toward the narrower side of the base portion 702 between the sides thereof to which the rails 704 are attached. The base portion 702 and the rails 704 may be configured to mate (interchangeably) with each other via an interchangeable connection assembly.

The interchangeable connection assembly may include, for example, a first set of reception slots 720 and a second set of reception slots 721 formed proximate to opposing sides of the base portion 702. Thus, for example, the first set of the reception slots 720 may be formed along one lateral side of the base portion 702, and the second set of the reception slots 721 may be formed along the opposite lateral side of the base portion 702 relative to a longitudinal centerline of the base portion 702. In the depicted example, each of the sets of the reception slots 720, 721 may include two edge slots 722 and a corresponding interior slot 724. The edge slots 722 may be adjacent to the lateral edges of the base portion 702 and may be on opposite sides of the longitudinal ends of the interior slot 724. The interior slot 724 may be spaced apart from the lateral edges of the base portion and from a line that passes through a longitudinal centerline of both of the edge slots 722. The interior slot 724 and the corresponding edge slots 722 of the first set of the reception slots 720 all extend substantially parallel to each other and to the corresponding lateral edge to which they are proximate. The interior slot 724 and the corresponding edge slots 722 of the second set of the reception slots 721 all extend substantially parallel to each other and to the corresponding lateral edge to which they are proximate, but are not parallel to the interior slot 724 and corresponding edge slots 722 of the first set of reception slots 720.

The rails 704 may each include a base ridge 730 away from which the adjacent protrusions 707 extend to form the slots 706. The base ridge 730 may further include fixed projections 732 that are configured to mate with the edge slots 722 and a flexible projection 734 that is configured to mate with the interior slot 724. The fixed projections 732 may be bent to extend away from a portion of the base ridge 730 that is adjacent to the base portion 702 when the rails 704 are mated with the base portion 702. In this regard, for example, the fixed projections 732 may be configured to extend away from a longitudinal centerline of the base ridge 730 at an angle. The angle may be selected such that the fixed projection 732 is substantially parallel to the plane in which the base portion 702 lies when the base portion 702 is attached with the corresponding one of the rails 704.

The flexible projection 734 may include at least a tab portion 740 and a catch portion 742. The tab portion 740 may remain on a first (or front) side of the base portion 702 after being passed through the interior slot 724 when the rail 704 is attached to the base portion 702. Meanwhile, the catch portion 742 may pass through the interior slot 724 to the other side of the base portion 702 (i.e., the second side or back side thereof). The catch portion 742 may be deflectable responsive to putting pressure on the tab portion 740 to move the tab portion 740 toward the longitudinal centerline of the base ridge 730 to remove the catch portion 742 from contact with an edge of the interior slot 724. However, when the tab portion 740 is not deflected, the tab portion 740 may be biased to moving the catch portion 742 outward and away from the longitudinal centerline of the base ridge 740. As can be appreciated from the description above, the fixed projections 732 and the flexible projection 734 may extend in opposite directions to engage the base portion 702.

Accordingly, to attach the rail 704 to the base portion 702, the fixed projections 732 may be aligned with the edge slots 722 (as shown in FIG. 7C). The fixed projections 732 may then be inserted through the edge slots 722 and pivoted to bring the fixed projections 732 toward being parallel with the base portion 702 while the flexible projection 734 is drawn by the pivoting toward the interior slot 724. As the fixed projections 732 reach a point where the fixed projections 732 are substantially parallel to the base portion 702, the catch portion 742 is drawn through the interior slot 724 and deflected inwardly until the catch portion 742 passes entirely through the interior slot 724 and extends to a direction opposite the direction of extension of the fixed projections 732. The catch portion 742 then retains the rail 704, along with the fixed projections 732, in attachment with the base portion 702.

To release the rail 704 (e.g., to swap the rails 704 to change the orientation of the slots 706), the tab portion 740 may be depressed or deflected to draw the catch portion 742 out of contact with the edge of the interior slot 724. The catch portion 742 can then be withdrawn from the interior slot 724 and the rail 704 can be pivoted to take the fixed projections 732 out of being parallel with the base portion 702. The catch portion 742 and the fixed projections 732 can then each be withdrawn from their respective slots to remove the rail 704. FIG. 7A shows the rails 704 removed, and FIG. 7B shows the rails 704 fully installed.

Figure 8:
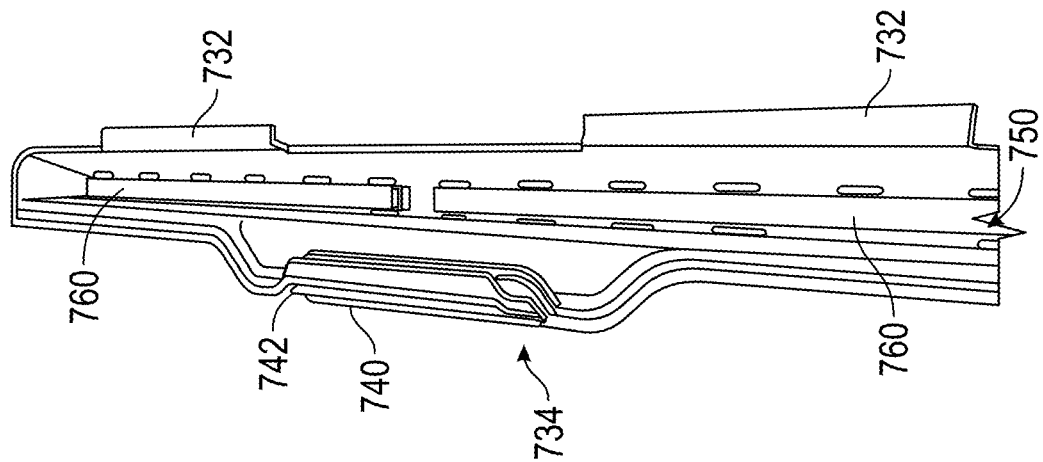
FIG. 8 illustrates an underside view of one of the rails to illustrate the inclusion of a magnet in a reception slot formed in the rail in accordance with an example embodiment.

Referring now to FIG. 8, an underside view of one of the rails 704 is shown. In this regard, FIG. 8 shows an interior portion of the base ridge 730, which forms a reception slot 750. In an example embodiment, one or more magnets 760 may be inserted into the reception slot 750. The magnets 760 may extend along the longitudinal centerline of the base ridge 730 within the reception slot 750 such that the magnets 760 are disposed proximate to the slot apexes 709 of the slots 706. In some cases, the reception slot 750 may include retaining projections that hold the magnets 760 in place within the reception slot 750. However, adhesives or other retaining means could alternatively be employed. The magnets 760 may help facilitate holding the wrenches within the slots 706 or guiding the wrenches into a respective one of the slots 706 during insertion.

In some embodiments, the reversible wrench rack may be further configured for optional modifications. In this regard, for example, the first rail and second side are releasably coupled to the first side or second side by a tongue and groove connector. In an example embodiment, the first rail and second rail are releasably coupled to the first side or second side by dove tail connection. In some example embodiments, the first rail and second rail are releasably coupled to the first side or second side by a pin and receiver connection. In an example embodiment, the first rail and second rail are releasably coupled to the first side or second side by snap fit connection. In some example embodiments, the first rail and second rail or base portion also includes a plurality of segments. One or more segments may be removed to accommodate a predetermined number of wrenches. In an example embodiment, the wrench rack is color coded to indicate a wrench type. In some example embodiments, the base portion comprises one or more mounting elements. In an example embodiment, the mounting elements are configured to be mounted in the first configuration and the second configuration.

Many modifications and other embodiments of the tool set forth herein will come to mind to one skilled in the art to which these inventions pertain having the benefit of the teachings presented in the foregoing descriptions and the associated drawings. Therefore, it is to be understood that the power tools are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A wrench rack comprising:
   a base portion comprising a first side, a second side, a first end, and a second end; the first side being opposite the second side and the first end being opposite the second end; the base portion comprising a first base coupling means and a second base coupling means; and
   a first rail and a second rail, each of the first rail and second rail comprising a plurality of wrench slots formed at a predetermined angle, the first rail comprising a first rail coupling means and the second rail comprising a second rail coupling means;
   wherein a first spacing between the first base coupling means and the second base coupling means at the first end of the base portion is larger than a second spacing of between the first base coupling means and the second base coupling means at the second end;
   wherein, in a first configuration, the first rail coupling means is releasably coupled to the first base coupling means and the second rail coupling means is releasably coupled to the second base coupling means;
   wherein, in a second configuration, the first rail coupling means is releasable coupled to the second base coupling means and the second rail coupling means is releasably coupled first base coupling means;
   wherein an orientation of the predetermined angle of the wrench slots of the first configuration relative to the first end is reversed in the second configuration.

2. The wrench rack of claim 1, wherein the first rail coupling means or the second rail coupling means is releasably coupleable to first base coupling means or the second base coupling means via a tongue and groove connection.

3. The wrench rack of claim 1, the first rail coupling means or the second rail coupling means is releasably coupleable to first base coupling means or the second base coupling means via a dove tail connection.

4. The wrench rack of claim 1, the first rail coupling means or the second rail coupling means is releasably coupleable to first base coupling means or the second base coupling means via a pin and receiver connection.

5. The wrench rack of claim 1, the first rail coupling means or the second rail coupling means is releasably coupleable to first base coupling means or the second base coupling means via a snap fit connection.

6. The wrench rack of claim 1, wherein the first rail and the second rail or base portion comprise: a plurality of segments, wherein one or more segments may be removed to accommodate a predetermined number of wrenches.

7. The wrench rack of claim 6, wherein base portion and the first and second rails each include multiple segments, and wherein at least one segment is disposed at each opposing end of both the base portion and the first and second rails.

8. The wrench rack of claim 6, wherein the one or more segments are formed by perforations that facilitate breaking or cutting the one or more segments to separate the one or more segments from the base portion or the first and second rails.

9. The wrench rack of claim 1, wherein the wrench rack is color coded to indicate a wrench type.

10. The wrench rack of claim 1, wherein the base portion comprises one or more mounting elements.

11. The wrench rack of claim 1, wherein the base portion comprises a plurality of mounting elements disposed at opposing ends of the base portion such that the wrench rack is configured to be mounted in the first configuration and the second configuration via the mounting elements.

12. The wrench rack of claim 1, the first rail coupling means or the second rail coupling means is releasably coupleable to first base coupling means or the second base coupling means via a tab and slot connection.

13. The wrench rack of claim 1, wherein each of the first base coupling means and the second base coupling means comprises a plurality of connector positions defined by slots disposed at different distances from a longitudinal center axis of the base portion.

14. The wrench rack of claim 1, wherein the first rail and the second rail are each defined by a base ridge including protrusions with slot apexes formed therebetween to define the wrench slots.

15. The wrench rack of claim 14, wherein the first base coupling means comprises a first set of reception slots disposed proximate to the first side of the base portion, and the second base coupling means comprises a second set of reception slots formed proximate to the second side of the base portion.

16. The wrench rack of claim 15, wherein the first and second sets of reception slots each include an edge slot and an interior slot, and wherein the first rail coupling means and second rail coupling means each include a quick release connection assembly configured to mate with the edge slot and the interior slot of a respective one of the first and second sets of reception slots.

17. The wrench rack of claim 14, wherein an interior portion of the base ridge defines a reception slot, and wherein one or more magnets are disposed to extend along a longitudinal centerline of the base ridge within the reception slot.

* * * * *